United States Patent [19]

Suyama

[11] 4,222,768

[45] Sep. 16, 1980

[54] METHOD FOR PRODUCING ELECTRIC STEEL

[75] Inventor: Itaru Suyama, Chiba, Japan

[73] Assignee: Asahi Giken Kogyo Kabushiki Kaisha, Tokyo, Japan

[21] Appl. No.: 20,178

[22] Filed: Mar. 13, 1979

[30] Foreign Application Priority Data

Mar. 14, 1978 [JP] Japan .................................. 53-28253
Feb. 29, 1979 [JP] Japan .................................. 54-21873

[51] Int. Cl.$^2$ .............................................. C21C 5/52
[52] U.S. Cl. .......................................... 75/12; 75/53; 75/57
[58] Field of Search ........................... 75/12, 13, 53, 57

[56] References Cited

U.S. PATENT DOCUMENTS

| | | | |
|---|---|---|---|
| 3,524,742 | 8/1970 | Williams | 75/57 |
| 3,579,325 | 5/1971 | Stone | 75/57 |

*Primary Examiner*—P. D. Rosenberg
*Attorney, Agent, or Firm*—Sherman & Shalloway

[57] ABSTRACT

In a method for producing carbon steel or alloy steel by an electric steel-making procedure comprising the steps of charging a steel scrap into an electric furnace, melting the scrap, refining the melt and separating the molten steel from the slag, the improvement wherein before the completion of the oxidation stage in the refining step, silicon carbide is charged into the furnace thereby decreasing the amounts of the constituent metals in the steel which will be oxidized and move to the slag.

9 Claims, No Drawings

METHOD FOR PRODUCING ELECTRIC STEEL

This invention relates to an improvement in or relating to a method for producing steel from steel scraps using an electric furnace.

Production of electric steel from steel scraps is known. Usually, the desired steel, for example carbon steel (ordinary steel) or alloy steels (special steels) containing chromium, manganese or molybdenum, is produced by melting and refining a steel scrap or a mixture of steel scrap with a ferro-alloy slag containing the oxides of the constituent metals of steel, or ore in an electric furnace.

Electric furnace refining of steel scraps generally includes the stages of charging, melting, refining, and and tapping, and the refining stage is divided into an oxidation stage and a reduction stage. The charging stage is the time of charging steel scrap. The steel scrap in a desired volume appropriate for the inside volume of the furnace shell may be charged at a time from the furnace top into the furnace by means of a basket; or as the melting of steel advances after the initial charge has been fed, an additional supply of the steel scrap may be charged once or twice until the steel scrap amounts to the total desired quantity.

The melting stage is a stage in which the furnace charge is melted by the heat of electric resistance or the heat of electric arc. To increase the rate of melting, other heat sources such as oxygen, or auxiliary burning materials such as heavy oils or kerosene are frequently used.

The oxidation stage involves blowing an oxygen gas or an oxygen-containing gas such as air directly into the melt within the furnace, or adding an oxidizer such as iron ore or mill scales, thereby to oxidize the unwanted metals such as phosphorus, zinc, tin or aluminum in the molten steel and cause them to be absorbed by the slag, or to remove them by gasification; and further performing boil refining by CO gas formed by the burning of carbon in the steel to remove noxious gases in the steel such as nitrogen and hydrogen and non-metallic inclusions. The reaction starts at a molten steel temperature slightly higher than the melting point of the molten steel from the end of the melting stage to the beginning of the oxidation stage. Toward the end of the oxidation stage when the temperature of the molten steel has reached a point about 80° to 100° C. above the melting point of the steel, oxygen is blown into the molten steel, and the oxidation stage is completed at the maximum temperature. The oxidized steel slag is removed, and the reduction stage is started up. In come cases, either one or both of the oxygen blowing operation and the slag removing operation are omitted before starting the reduction stage.

In the reduction stage, a reducing agent such as lime, fluorspar or silica sand is introduced to remove oxygen in the steel which has increased in the oxidation stage and the included S and to form a highly basic reduced steel slag. To adjust the desired components, ferromanganese, ferro-silicon, silicomanganese and other alloy steels are charged to deoxidize steel forcedly with Si, Mn, Al, etc. and to reduce the oxygen concentration of steel further, thereby completing the refining of the steel.

In the tapping stage, the molten steel which has been finally refined in the reduction stage is poured into a ladle. It is the general practice to charge a carbonaceous material and alloy steels, or a reducing agent such as Al, Ca-Si or Si-C into the ladle before the receiving of the molten steel for adjustment of the constituents of the steel, or for deoxidation and desulfurization of the steel, in the ladle.

In the melting stage and oxidation stage, the constituent metals of the starting steel scrap are partly oxidized to form metal oxides which form an oxidized steel slag together with the metal oxides originally contained in the steel scrap and a slag-forming agent that may be added afterward, and become a loss.

Nowadays, the amounts of the aforesaid auxiliary burning materials and oxygen tend to increase, resulting in a higher degree of oxidation of metals in the scrap melting stage. Thus, the loss of these metals by oxidation cannot be ignored in the present-day operation. For example, the content of the oxides of useful metals in the oxidized steel slag amounts to 30 to 50%, and the loss of steel scrap in an operation with an arc electric furnace is estimated at 2 to 4%.

Metal oxides in the steel scraps and metal oxides formed in the melting stage and the oxidation stage are partly recovered in the molten steel by reductive refining. However, to recover them in the reduction stage decreases the percentage of effectively utilized ferrosilicon, ferro-manganese, silicomanganese, etc. and increases the operating coat. Desirably, therefore, these metal oxides should be recovered in the oxidation stage.

Methods are known to recover metal oxides contained in the oxidized steel slag by using carbonaceous materials such as coke and electrode residues or reducing agents such as ferro-silicon. When the carbonaceous materials are used, the consumption of power increases because the reduction of the metal oxides with these materials is an endothermic reaction. Furthermore, since the specific gravity of the carbonaceous material is lower than that of steel slag, the carbonaceous material floats to the surface portion of the steel slag. Thus, there are great losses of the carbonaceous material by combustion with the excess oxygen in the furnace, and the percentage of the effectively utilized carbonaceous material is low. Moreover, long periods of time are required to perform the reaction. For these reasons, the method of recovery using carbonaceous material is economically disadvantageous. On the other hand, the method of recovery using ferro-silicon as a reducing agent is not practical because the ferro-silicon is expensive.

It is an object of this invention therefore to provide a method for producing electric steel, which can effectively decrease the proportion of metal oxides lost in the oxidized steel slag during the oxidation stage, can complete the oxidation stage while preventing the excessive increase of the concentration of oxygen in the steel and the concentration of metal oxides in the steel slag, and can give steel of good quality and a high degree of purification with reduced amounts of non-metallic inclusions.

The above object of this invention is achieved by an improved method for producing carbon steel or alloy steel by an electric steel-making procedure comprising the steps of charging a steel scrap into an electric furnace, melting the scrap, refining the melt and separating the molten steel from the slag; wherein before the completion of the oxidation stage in the refining step, silicon carbide is charged into the furnace, thereby decreasing the amounts of the constituent metals in the steel which will be oxidized and move to the slag.

It is important in this invention to charge silicon carbide into the furnace before the completion of the oxidation stage. The time "before the completion of the oxidation stage", as used herein, means any time before the removal of oxidized steel slag when the slag is to be removed in the last stage of oxidation; and any time before the temperature of molten steel has reached a point 100° C. above its melting point when the oxidation stage is to be switched over to the reduction stage without removing the oxidized steel slag.

Silicon carbide is charged into the furnace at a time after the completion of the melting stage and before the completion of the oxidation stage, preferably before the temperature of molten steel reaches a point 50° C. higher than the melting point of the steel (charging during the oxidation stage); or it is added to the hearth before the completion of the melting stage, preferably before the charging of the starting steel scrap, or it is added together with steel scraps at the time of additionally charging the steel scraps, or it is added at both of these times (charging before the melting stage). These procedures have their own unique advantages.

The former has the advantage that since the steel has been completely melted, its constituents can be accurately analyzed, and therefore, the amount of SiC required can be accurately determined. The latter has the advantage that because SiC is in contact with the steel throughout the melting stage, it dissolves well in the steel, and can be utilized in a high ratio.

For the above reason, when the steel scrap is a low-grade scrap not assorted according to grades or a scrap whose metal oxide contents and carbon content are difficult to determine, it is desirable to charge silicon carbide during the oxidation stage after the chemical composition of the molten steel has been determined.

When silicon carbide is to be charged during the oxidation stage, the charging can be effected by spraying silicon carbide onto the surface of the oxidized steel slag. Preferably, silicon carbide is directly jetted into the molten steel using a carrier gas such as air, nitrogen or argon, and thus is directly contacted with the molten steel.

When the starting steel scrap has a definite grade and the composition of molten steel can be easily predicted, the method of charging before melting can be suitably used. This method is conveniently practiced by charging silicon carbide packed with a steel sheet. A suitable method of packing is to place silicon carbide weighed to a predetermined amount into a steel can such as a drum can, apply a closure on it, and collapse it with a press to shape it into a rectangular-parallelpipedal block. The packed carbon silicon carbide is caused to be attracted to electromagnets, and charged into the furnace. Its handling is therefore much easier than unpacked silicon carbide.

There have previously been known a method of deoxidizing molten steel directly or indirectly which comprises adding silicon carbide to the bare surface of molten steel immediately after removal of the oxidized steel slag, or spraying a powder of silicon carbide on the reduced steel at the time of reductive refining; and a method of increasing the contents of carbon and silicon in the molten steel which comprises charging silicon carbide into the furnace immediately before tapping of the steel product from the furnace, or providing silicon carbide in the ladle and pouring the molten steel into it.

Essentially, however, the above known methods are directed merely to deoxidation at the reduction stage, or to the adjustment of the Si and C components in steel. With such methods, it is impossible to decrease the amounts of metal oxides which move into the oxidized steel slag and to advantageously recover useful metals in the molten steel.

In contrast, when silicon carbide is charged into the furnace before the completion of the oxidation stage in accordance with this invention, various advantages can be obtained. For example, it is possible to prevent the excessive oxidation of molten steel in the melting stage and the oxidation stage and thus to reduce the loss of valuable substances discarded as oxidized metals. Furthermore, the ratio of the deoxidized effectively used in the reduction stage is increased, and the reductive refining of molten steel is easy. Still another advantage is that the consumption of heat energy can be curtailed.

In the present invention, a wide range of carbon steel scraps can be used. Examples include factory-own scraps such as ingot scrap, rolling scrap or cutting scrap, motor vehicle scraps, ship scraps, household scraps such as washing machines and refrigerators, and discarded can scraps such as oil containers. Scraps of alloy steels such as chromium steel or manganese steel can also be used.

The typical compositions of such steel scraps and molten steel products produced therefrom are tabulated below.

|  | Starting scrap | Product |
| --- | --- | --- |
| Carbon steel |  |  |
| C | 0.1–0.4 | 0.15–0.25 |
| Si | 0.2–0.5 | 0.25–0.35 |
| Mn | 0.4–0.7 | 0.5–0.7 |
| P | 0.03–0.06 | 0.02–0.04 |
| Chromium steel (13% Cr) |  |  |
| C | 0.1–0.2 | 0.1–0.15 |
| Cr | 11.0–18.0 | 11.5–13.5 |
| Si | 0.5–0.8 | 0.6–0.8 |
| Mn | 0.5–0.9 | 0.6–0.8 |
| P | 0.01–0.05 | 0.02–0.04 |
| S | 0.01–0.03 | 0.01–0.03 |
| Chromium steel (18% Cr) |  |  |
| C | 0.1–0.2 | 0.08–0.12 |
| Cr | 11.0–18.0 | 16.0–18.0 |
| Si | 0.5–0.8 | 0.5–0.7 |
| Mn | 0.5–0.9 | 0.6–0.8 |
| P | 0.01–0.05 | 0.6–0.8 |
| S | 0.01–0.03 | 0.01–0.03 |
| High manganese steel |  |  |
| C | 1.10–1.30 | 1.10–1.25 |
| Mn | 11.0–14.0 | 12.0–14.0 |
| Si | 0.3–0.6 | 0.4–0.6 |
| P | 0.05'0.10 | 0.05–0.07 |
| S | 0.02–0.05 | 0.02–0.04 |

Together with the aforesaid starting steel scraps, there can be fed into the furnace ores containing the constituent metals of steel such as iron, chromium, manganese or molybdenum, for example hematite, magnetite, chromite, pyrolusite, manganese spar, and molybdenum oxide ore, or an oxide slag obtained at the time of refining these metals. These metal oxides are reduced to the metals by the method of this invention and recovered as constituent metals in the steel.

In the present invention, known slag-forming agents used in ordinary steel-making techniques can be employed. Typical examples are limestone, fluorpar, bauxite, dolomite and iron ore. Use of a combination of limestone and fluorspar is advantageous.

Usually, the slag-forming agent is fed into molten steel immediately after the completion of the melting stage.

Silicon carbide used in this invention needs not to be of high grade, and crude silicon carbide called a "recycle material" in the production of silicon carbide can be used.

The recycle material is silicon carbide of a very small crystal shape and of low grade which is obtained during the production of silicon carbide. It is re-used as a material for the production of silicon carbide of α-crystal type. It can be used either singly or in combination with α-crystals.

In the reduction of metal oxides in the oxidized steel slag with silicon carbide, the following chemical reactions take place.

$$3FeO + SiC = SiO_2 + CO + 3Fe$$

$$3MnO + SiC = SiO_2 + CO + 3Mn$$

$$Cr_2O_3 + SiC = SiO_2 + CO + 2Cr$$

$$Fe_2O_3 + SiC = SiO_2 + CO + 2Fe$$

Silicon carbide has a specific gravity of 3.2 which is lower than the specific gravity (6.8–7.1) of molten steel and is higher than the specific gravity (2.5–3.0) of the oxidized steel slag. Hence, with the progress of melting, silicon carbide is partly absorbed by the molten steel, and the remainder is suspended in the interface between the molten steel and the oxidized steel slag and is not exposed to the surface of the steel slag. Thus, the metallic oxides in the oxidized steel slag can be reduced and recovered with good efficiency.

Since the reactions between silicon carbide and metal oxides in accordance with the above reaction formulae are exothermic, power consumption can be reduced owing to heat of reaction, and the operating time can be shortened.

The oxides of iron, manganese and chromium contained in the oxidized steel slag include not only FeO, MnO and $Cr_2O_3$, but also higher oxides such as $Fe_2O_3$, $Mn_2O_3$ and $CrO_3$. To increase the efficiency of reducing the metals with silicon carbide, it is necessary that the amount of the higher oxides should be small, and the activity coefficient of the oxides should be high. It is advisable therefore to adjust the basicity of the molten mass in the furnace. Adjustment of the basicity is usually performed by using CaO or $SiO_2$.

In the present invention, therefore, it is preferred to use a mixture of silicon carbide with lime and/or silica sand, etc.

The amount of silicon carbide used in the method of this invention is determined according to the contents of metal oxides in the molten mass in the furnace which can be recovered by chemical reactions based on aforesaid reaction equations. Specifically, it is determined depending upon the amounts of the metal oxides which are formed and moved to the metal slag according to the operating conditions of the melting stage, and the amounts of the metal oxide slag charged together with the steel scrap, and/or the metal oxide ores. Generally, silicon carbide is used in an amount of about 3 to 10 kg per ton of the starting steel scrap.

Melting and refining in accordance with this invention can be conveniently effected by using an arc furnace. An induction furnace and other types of electric furnace can also be used.

In the method of this invention, refining in the oxidation stage can be effected conveniently by blowing an oxygen gas or an oxygen-containing gas such as air into the furnace. Instead of using oxygen or the oxygen-containing gas, the addition of an oxidizer such as iron ore or mill scale to the molten mass in the furnace can also serve to achieve refining in the oxidation stage.

The method of this invention is characterized by the fact that silicon carbide is charged into the furnace at any desired time before the end of the oxidation stage, and is kept present in the oxidation stage, or both in the melting stage and the oxidation stage. However, the blowing of oxygen or the oxygen-containing gas or the introduction of the oxidizer to provide the oxidation stage is known.

In the method of this invention, a carbonaceous material, ferro-silicon, etc. may be charged into the furnace in an amount of up to 200 parts by weight per 100 parts by weight of silicon carbide together with silicon carbide.

The refining in the reduction stage in accordance with this invention is carried out by known methods. Specifically, after removing the oxidized steel slag in the last stage of the oxidation stage, or after the temperature of the molten steel has reached a point at least 100° C. above its melting point (when the oxidized steel slag is not removed), a reducing agent such as a carbonaceous material or ferro-silicon is added to the molten mass in the furnace to deoxidize the molten steel. Then, the reduced steel slag is separated from the molten steel, and the steel product is tapped after removing the reduced steel slag.

Desired additives may be added to the steel deprived of the reduced steel slag immediately before the steel tapping or after the tapping so as to adjust the constituents.

The method of this invention described hereinabove can bring about the following advantages over conventional methods.

(1) Since the oxides of useful metals can be reduced and recovered in steel, the amount of the molten steel increases and the yield of the product increases.

(2) The generation of the heat of oxidation reaction of silicon carbide permits a decrease in power consumption and shortening of the operating time.

(3) The amount of a deoxidizer in the reduction stage can be curtailed because the concentrations of metal oxides in the oxidized steel slag in the last stage of oxidation are reduced.

(4) In the production of manganese steel and chromium steel, the losses of manganese and chromium in the steel scrap can be reduced, and highly valuable metals can be positively recovered from the ores or ferro-alloy slag on a commercial basis.

The following Examples illustrate the present invention in greater detail.

EXAMPLE 1

(A) An arc electric furnace having a furnace capacity of 20 tons and a transformer capacity of 10,000 K.V.A. was charged with 30,000 kg of carbon steel scrap and 500 kg of quicklime. An electric current was passed through the furnace to melt the steel scrap. Charging of the steel scrap was performed such that 16,400 kg of it was initially charged, and 20 minutes after the starting of current passing, the remaining 13,600 kg was additionally charged. The starting steel scrap was completely melted in 62 minutes after the starting of current passing. At this time, the temperature of the molten steel was 1,530° C., and 2,100 kg of a steel slag formed. The average composition of the starting steel scrap was as follows:

| C | 0.25% |
|---|---|
| Si | 0.34% |
| Mn | 0.48% |
| P | 0.045% |
| S | 0.030% |

Immediately after the complete melting of the scrap, samples for analyzing the steel slag and the molten steel were taken out. One minute after the complete melting (when the temperature of the molten steel reached 1,540° C.), 230 kg of silicon carbide was injected into the molten steel using nitrogen as a carrier gas over the course of 2 minutes while an electric current was continuously passed through the furnace. Nine minutes later, an oxygen gas was blown into the furnace for 4 minutes at a rate of 80 m³/min. At the end of oxygen blowing, the temperature of the molten steel reached 1,620° C. The silicon carbide charged had the average composition: 19.8% free carbon, 62.5% silicon carbide, 6.4% Al₂O₃, and the balance being SiO₂ and Fe, and the following particle size distribution.

| >A.S.T.M. No. 7 | (2830 μ) | 14.5% |
|---|---|---|
| >A.S.T.M. No. 10 | (2000 μ) | 28.2% |
| >A.S.T.M. No. 18 | (1000 μ) | 46.5% |
| >A.S.T.M. No. 35 | (500 μ) | 65.5% |
| >A.S.T.M. No. 60 | (250 μ) | 84.6% |

After the blowing of oxygen, the slag was immediately removed, and 150 kg of quicklime, 30 kg of fluorspar and 18 kg of coke powder were sprayed onto the molten steel in this order to form a reduced steel slag. Then, 215 kg of silicomanganese and 50 kg of ferro-silicon were charged, and three minutes later, the molten steel was poured into a ladle, and the molten steel was separated from the reduced steel slag.

(B) Electric steel was made in the same way as described in section (A) above except that the silicon carbide was charged by spraying it onto the oxidized steel slag.

(C) For comparison, electric steel was produced from steel scrap in the same way as described in (B) above except that 360 kg of a briquette-like carburizing agent (C=50%, Fe=45%, the balance=ash) was used instead of 230 kg of silicon carbide, the blowing of oxygen was not performed, and 18 kg of a powder of carbon electrode was sprayed onto the bare molten steel after the removal of the slag.

(D) Table 1 summarizes the results of producing electric steels in sections (A), (B) and (C) above.

Table 1

|  |  | Invention | | (C) Comparison |
|---|---|---|---|---|
|  |  | (A) Jetting method | (B) Spraying method |  |
| Fe (%) in steel slag immediately before charging of SiC or carburizing agent |  | 46.23 | 45.75 | 45.64 |
| Components of molten steel immediately before charging of SiC or carburizng agent | C % | 0.04 | 0.05 | 0.05 |
|  | Si % | trace | trace | trace |
|  | Mn % | 0.07 | 0.08 | 0.08 |
|  | P % | 0.041 | 0.037 | 0.039 |
|  | S % | 0.029 | 0.027 | 0.031 |
| Oxygen concentration (ppm) in the above molten steel |  | 480 | 456 | 447 |
| Fe (%) in steel slag 5 minutes after charging of SiC or carburizing agent |  | 24.51 | 32.63 | 40.62 |
| Components of the above molten steel | C % | 0.16 | 0.12 | 0.08 |
|  | Si % | 0.03 | 0.01 | trace |
| Oxygen concentration (ppm) of the above molten steel |  | 254 | 363 | 408 |
| Fe (%) in steel slag 10 minutes after charging of SiC or carburizing agent |  | 16.72 | 19.63 | 34.50 |
| Components of the above molten steel | C % | 0.23 | 0.21 | 0.10 |
|  | S % | 0.01 | 0.01 | trace |
| Oxygen concentration (ppm) of the above molten steel |  | 240 | 285 | 383 |
| Composition of the molten steel tapped | C % | 0.18 | 0.17 | 0.19 |
|  | Si % | 0.23 | 0.27 | 0.22 |
|  | Mn % | 0.54 | 0.56 | 0.53 |
|  | P % | 0.025 | 0.029 | 0.028 |
|  | S % | 0.017 | 0.019 | 0.023 |
| Power consumption per ton of furnace charge |  | 338 | 342 | 358 |
| Operating time (minutes) |  | 85 | 86 | 90 |
| Amount of molten steel tapped |  | $27^T 960$ | $27^T 900$ | $27^T 32$. |

EXAMPLE 2

Electric steel was produced in the same way as in Example 1 except that 180 kg of silicon carbide having the following particle diameter distributions and compositions was fed into the bottom of the furnace immediately before charging the steel scrap.

Table 2

| Particle diameter distribution (weight %) |  | Composition | | |
|---|---|---|---|---|
|  |  | Free C (%) | SiC (%) | Al₂O₃ (%) |
| 40 mm–15 mm | 7.7 | 19.2 | 65.3 | 6.3 |
| 14 mm–4 mm | 69.2 | 18.9 | 58.2 | 7.1 |

Table 2-continued

| Particle diameter distribution (weight %) | | Composition | | |
|---|---|---|---|---|
| | | Free C (%) | SiC (%) | Al$_2$O$_3$ (%) |
| 3 mm-1 mm | 16.8 | 20.8 | 64.3 | 6.3 |
| below 1 mm | 4.8 | 20.5 | 62.1 | 6.0 |
| Average value | | 19.8 | 62.5 | 6.4 |

(Balance: SiO$_2$, Fe, etc.)

For comparison, electric steel was produced in the same way as above except that 350 kg of the same carburizing agent as used in Example 1 was used instead of the silicon carbide, and added at the time of charging an additional feed of the steel scrap.

The results are shown in Table 3.

Table 3

| | | Invention | Comparison |
|---|---|---|---|
| FeO (%) in the steel slag at time of complete melting of the scrap | | 19.21 | 37.95 |
| FeO (%) at the last stage of oxidation | | 10.05 | 21.20 |
| Composition of molten steel at the last stage of oxidation | C (%) | 0.12 | 0.08 |
| | Si (%) | 0.01 | 0.01 |
| | Mn (%) | 0.20 | 0.13 |
| | P (%) | 0.018 | 0.018 |
| | S (%) | 0.031 | 0.028 |
| Composition of steel tapped | C (%) | 0.21 | 0.20 |
| | Si (%) | 0.27 | 0.25 |
| | Mn (%) | 0.54 | 0.52 |
| | P (%) | 0.026 | 0.027 |
| | S (%) | 0.022 | 0.023 |
| Power consumption per ton of furnace charge (K.W.H.) | | 340 | 355 |
| Operating time (minutes) | | 83 | 90 |
| Amount of steel tapped (kg) | | 27,940 | 27,360 |

EXAMPLE 3

High manganese steel was produced in the same way as in Example 2 except that an arc electric furnace having a furnace capacity of 5 tons and a transformer capacity of 2,500 K.V.A. and a furnace charge having the composition tabulated below were used, silicon carbide was charged as a mixture with the starting steel scraps, the entire furnace charge was added at the outset of the operation, blowing of oxygen was not effected at the last stage of oxidation, and the C, Mn and Si contents were adjusted by a carbonaceous material, ferrosilicon and low-carbon ferromanganese.

Table 4

| Furnace charge | Composition (%) | Amont (kg) |
|---|---|---|
| High manganese steel scrap | C: 1.15, Mn: 13,40, Si: 0.37, P: 0.058, S: 0.035 | 5,250 |
| Carbon steel scrap | Same as in Example 2 | 750 |
| Silicon carbide | SiC: 85, free C: 12 | 50 |

For comparison, high manganese steel was made in the same way as above except that 60 kg of coke was used instead of the silicon carbide.

The results are shown in Table 5.

Table 5

| | | Invention | Comparison |
|---|---|---|---|
| MnO (%) in the steel slag at the time of complete melting of the scrap | | 12.3 | 38.7 |
| MnO (%) at the last stage of oxidation | | 6.7 | 31.4 |
| | C (%) | 1.08 | 1.21 |
| | Si (%) | 0.18 | 0.08 |
| Composition of molten steel at the last stage of oxidation | Mn (%) | 10.6 | 7.2 |
| | P (%) | 0.051 | 0.056 |
| | S (%) | 0.036 | 0.038 |
| | C (%) | 1.23 | 1.20 |
| | Si (%) | 0.35 | 0.39 |
| Composition of steel tapped | Mn (%) | 13.47 | 13.35 |
| | P (%) | 0.055 | 0.067 |
| | S (%) | 0.018 | 0.017 |
| Amount of low-carbon ferro-manganese (kg) | | 210 | 470 |
| Amount of ferro-silicon (kg) | | 13 | 19 |
| Power consumption per ton of furnace charge (K.W.H.) | | 653 | 720 |
| Operating time (minutes) | | 152 | 205 |
| Amount of steel tapped (kg) | | 5720 | 5690 |

EXAMPLE 4

High manganese steel was produced in the same way as in Example 3 except that a manganese slag formed during the production of medium-carbon ferro-manganese was added further to the furnace charge. Feeding of the furnace charge was effected in the same way as in Example 3 except that a mixture of the manganese slag and silicon carbide was charged into the bottom of the furnace, and then the manganese steel scrap and carbon steel scrap were added, and ferro-manganese was not added in the reduction stage.

The composition of the furnace charge was as follows:

Table 6

| Furnace charge | Composition (%) | Amount (kg) |
|---|---|---|
| High manganese steel scrap | Same as in Example 3 | 4,800 |
| Carbon steel scrap | Same as in Example 3 | 1,000 |
| Manganese slag | MnO: 32 | 900 |
| Silicon carbide | SiC: 58, free C: 26 | 140 |

The results are shown in Table 7.

Table 7

| | | |
|---|---|---|
| MnO (%) in the steel slag at the time of complete melting of the scrap | 19.4 | |
| MnO (%) at the last stage of oxidation | 8.2 | |
| Composition of molten steel at the last stage of oxidation | C (%) | 1.12 |
| | Si (%) | 0.24 |
| | Mn (%) | 12.8 |
| | P (%) | 0.046 |
| | S (%) | 0.035 |
| Composition of steel tapped | C (%) | 1.21 |
| | Si (%) | 0.37 |
| | Mn (%) | 13.40 |
| | P (%) | 0.051 |
| | S (%) | 0.091 |
| Power consumption per ton of furnace charge | | 590 |

Table 7-continued

| (K.W.H.) | |
|---|---|
| Operating time (minutes) | 140 |
| Amount of steel tapped | 5810 |

EXAMPLE 5

Molten 13% stainless steel was produced in the same way as in Example 2 except that an arc electric furnace having a capacity of 10 tons and a transformer capacity of 3,500 K.V.A. and a furnace charge of the composition tabulated below were used, silicon carbide as a mixture with coke and quicklime was initially charged and then the steel scraps were charged. The molten steel can be used to produce 13% stainless steel by refining it again in an A. O. D. furnace.

Table 8

| Furnace charge | Composition | Amount (kg) |
|---|---|---|
| 13% stainless steel scrap | Cr: 13.5, C: 0.1, Si: 0.73, Mn: 0.85, P: 0.035, S: 0.034 | 8,500 |
| Cutting scrap of 13% stainless steel | Cr: 13.5, C: 0.1, Si: 0.73, Mn: 0.85, P: 0.035, S: 0.034 | 3,500 |
| Silicon carbide | SiC: 65, free C: 25 | 250 |
| Coke particles | Fized carbon: 82 | 60 |
| Quicklime | | 540 |

For comparison, molten 13% stainless steel was produced in the same way as above except that 300 kg of a 4:1 mixture of coke particles and ferro-silicon particles and 100 kg of quicklime were used instead of the mixture of silicon carbide, coke particles and quicklime.

The results are shown in Table 9.

Table 9

| | | Invention | Comparison |
|---|---|---|---|
| $Cr_2O_3$ in the oxidized steel stag (%) | | 3.5 | 32.6 |
| Components of molten steel tapped | C (%) | 1.4 | 1.3 |
| | Si (%) | 0.3 | 0.3 |
| | Cr (%) | 13.1 | 11.9 |
| Temperature of the molten steel tapped (°C.) | | 1,565 | 1,560 |
| Basicity of the oxidized steel slag | | 1.8 | 1.4 |
| Amount of Cr in the oxidized steel slag (kg) | | 21.5 | 154 |
| Yield of chromium (%) | | 98.7 | 90.5 |

EXAMPLE 6

Molten 18% stainless steel was produced in the same way as in Example 5 except that chromite and 50% ferro-silicon were used instead of the coke particles, and silicon carbide was charged into the bottom of the furnace as a mixture with chromite, 50% ferro-silicon and quicklime at the start of the operation.

The furnace charge had the following composition.

Table 10

| Furnace charge | Composition (%) | Amount (kg) |
|---|---|---|
| 13% stainless steel scrap | Same as in Example 5 | 8,000 |
| Cutting scrap of 13% stainless steel | " | 2,000 |
| Chromite | $Cr_2O_3$: 50,9, FeO: 13.8 | 1,800 |
| Silicon carbide | SiC: 60, free C: 28 | 450 |
| Ferro-silicon | Si: 50 | 100 |
| Quicklime | | 12 940 |

The results are shown in Table 11.

Table 11

| $Cr_2O_3$ (%) in the steel slag at the last stage of oxidation | | 4.2 |
|---|---|---|
| Components of molten steel tapped | C (%) | 1.3 |
| | Si (%) | 0.4 |
| | Cr (%) | 18.3 |
| Temperature of the molten steel tapped (°C.) | | 1,560 |
| Basicity of the oxidized steel slag | | 1.7 |
| Amount of Cr in the oxidized steel slag (kg) | | 63.2 |
| Yield of chromium (%) | | 96.8 |

EXAMPLE 7

Electric steel was produced in the same way as in Example 2 except that 100 kg of silicon carbide was filled into each of two drum cans. The drum cans were collapsed each into a rectangular-parallelpipedal block having a size of 550 mm × 250 mm × 500 mm, and these SiC-packed drums were charged into the furnace by means of electromagnets.

The results are shown in Table 12.

Table 12

| FeO (%) in the steel slag at the time of complete melting of the scrap | | 17.37 |
|---|---|---|
| FeO (%) at the last stage of oxidation | | 11.23 |
| Composition of molten steel at the last stage of oxidation | C (%) | 0.26 |
| | Si (%) | 0.03 |
| | Mn (%) | 0.16 |
| | P (%) | 0.023 |
| | S (%) | 0.031 |
| Composition of molten steel tapped | C (%) | 0.19 |
| | Si (%) | 0.20 |
| | Mn (%) | 0.62 |
| | P (%) | 0.028 |
| | S (%) | 0.016 |
| Power consumption per ton of furnace charge (K.W.H.) | | 335 |
| Operating time (minutes) | | 80 |
| Amount of steel tapped (kg) | | 28,130 |

What is claimed is:

1. In a method for producing carbon steel or alloy steel by an electric steel-making procedure comprising the steps of charging a steel scrap into an electric furnace, melting the scrap, refining the melt by an oxidation stage and reduction stage and separating the molten steel from the slag, the improvement comprising charging silicon carbide into the furnace at any time before the completion of the oxidation stage in the refining step, thereby decreasing the amounts of the constituent metals in the steel which will be oxidized and move to the slag.

2. The method of claim 1 for producing alloy steel wherein an ore or a slag containing the oxides of the constituent metals of the product alloy steel is charged together with the steel scrap.

3. The method of claim 2 wherein the slag or ore to be charged together with the steel scrap is selected from the group consisting of a ferro-manganese slag, a ferro-chromium slag, manganese ore, chromite and molybdenum oxide ore.

4. The method of claim 1 wherein a slag-forming agent, or a reducing agent, or both are charged together with the silicon carbide.

5. The method of claim 1 wherein the silicon carbide is charged into the furnace before the melting step is completed.

6. The method of claim 5 wherein the silicon carbide is charged in the form packed with an iron plate.

7. The method of claim 1 wherein the silicon carbide is charged after the completion of the melting step.

8. The method of claim 7 wherein the charging of silicon carbide is carried out by blowing.

9. The method of claim 7 wherein the charging of the silicon carbide is carried out before the temperature of the molten steel reaches a point 50° C. above the melting point of the molten steel.

* * * * *

UNITED STATES PATENT AND TRADEMARK OFFICE
CERTIFICATE OF CORRECTION

PATENT NO. : 4,222,768
DATED : Sept. 16, 1980
INVENTOR(S) : ITARU SUYAMA

It is certified that error appears in the above—identified patent and that said Letters Patent is hereby corrected as shown below:

Cover page, paragraph [30], second Priority Date, delete "29", and insert --28--.

Signed and Sealed this

Twenty-eighth Day of April 1981

[SEAL]

Attest:

RENE D. TEGTMEYER

Attesting Officer

Acting Commissioner of Patents and Trademarks